Patented Sept. 14, 1926.

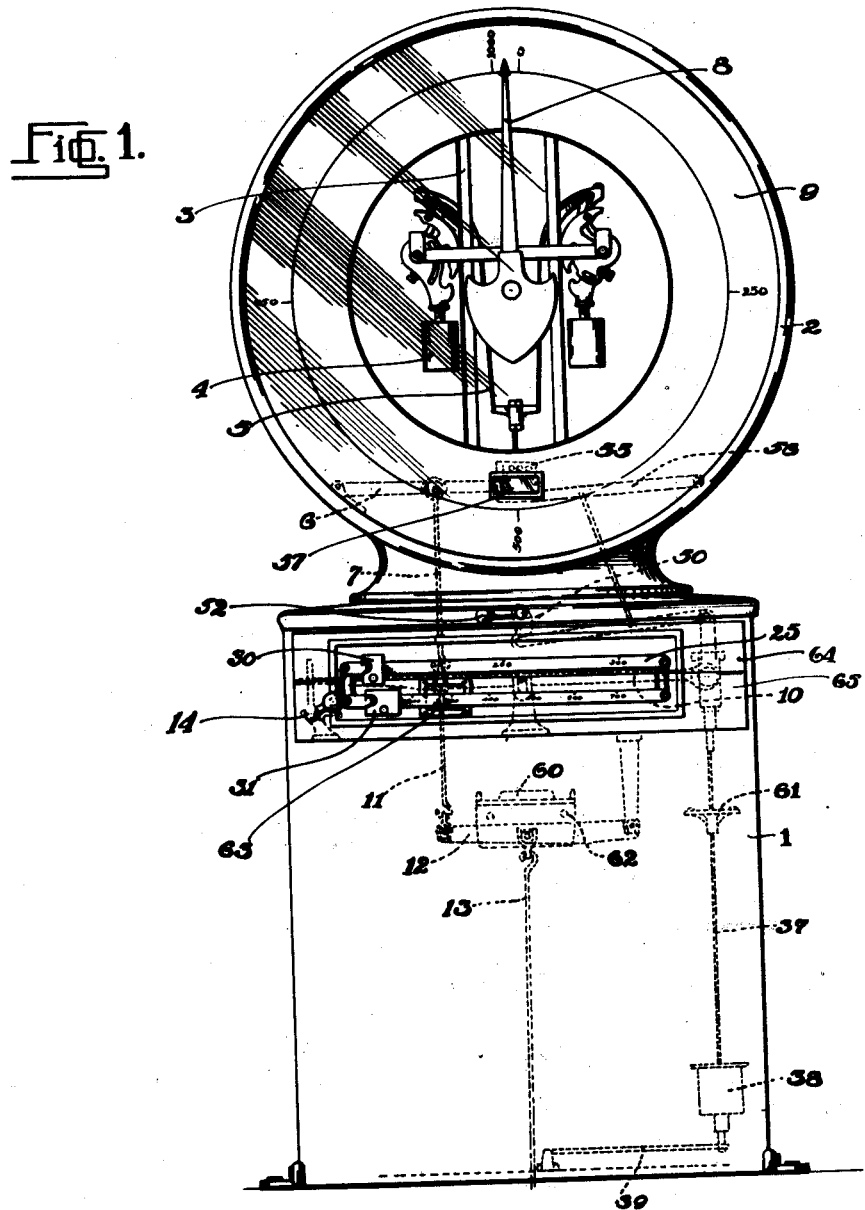

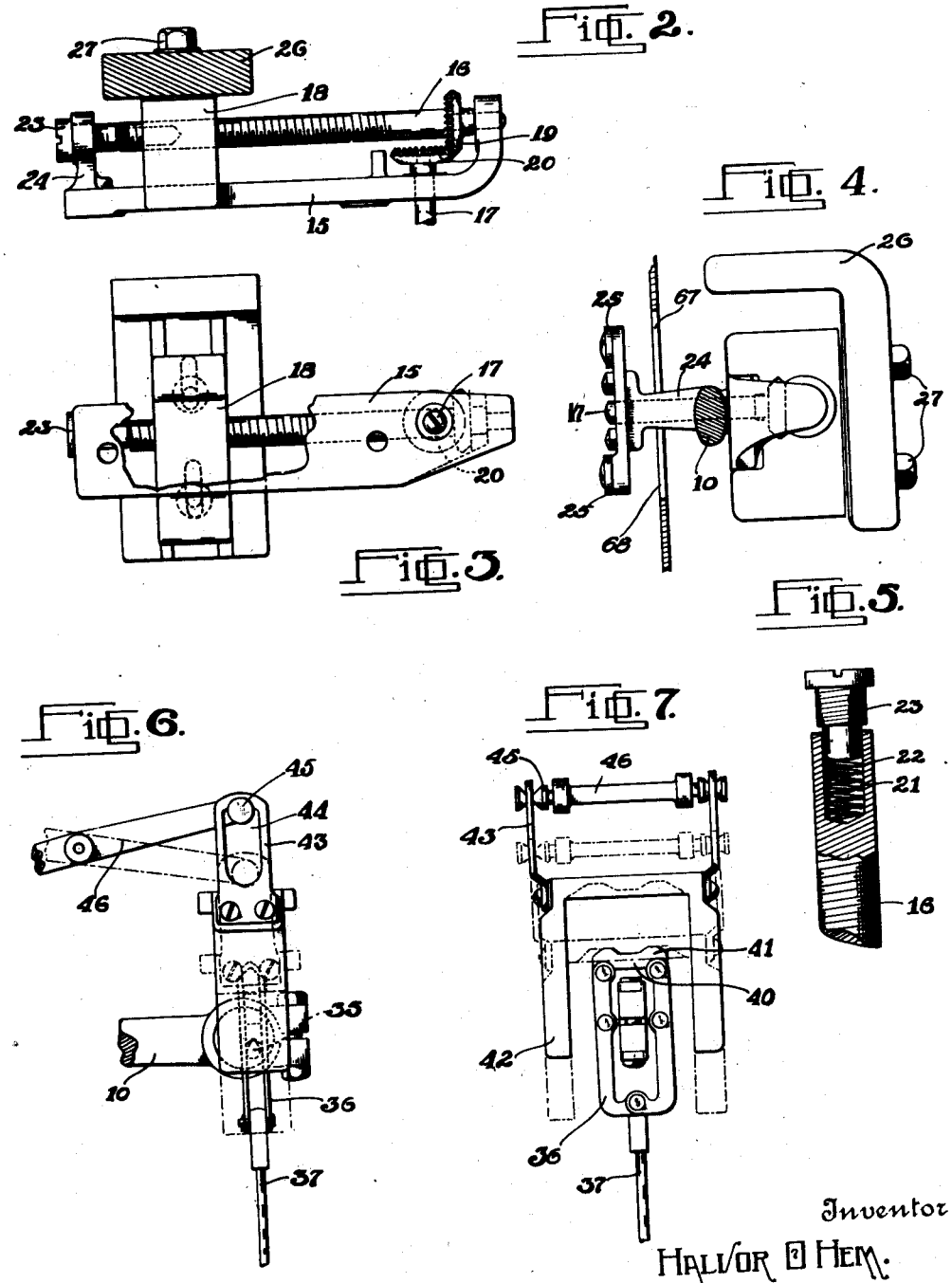

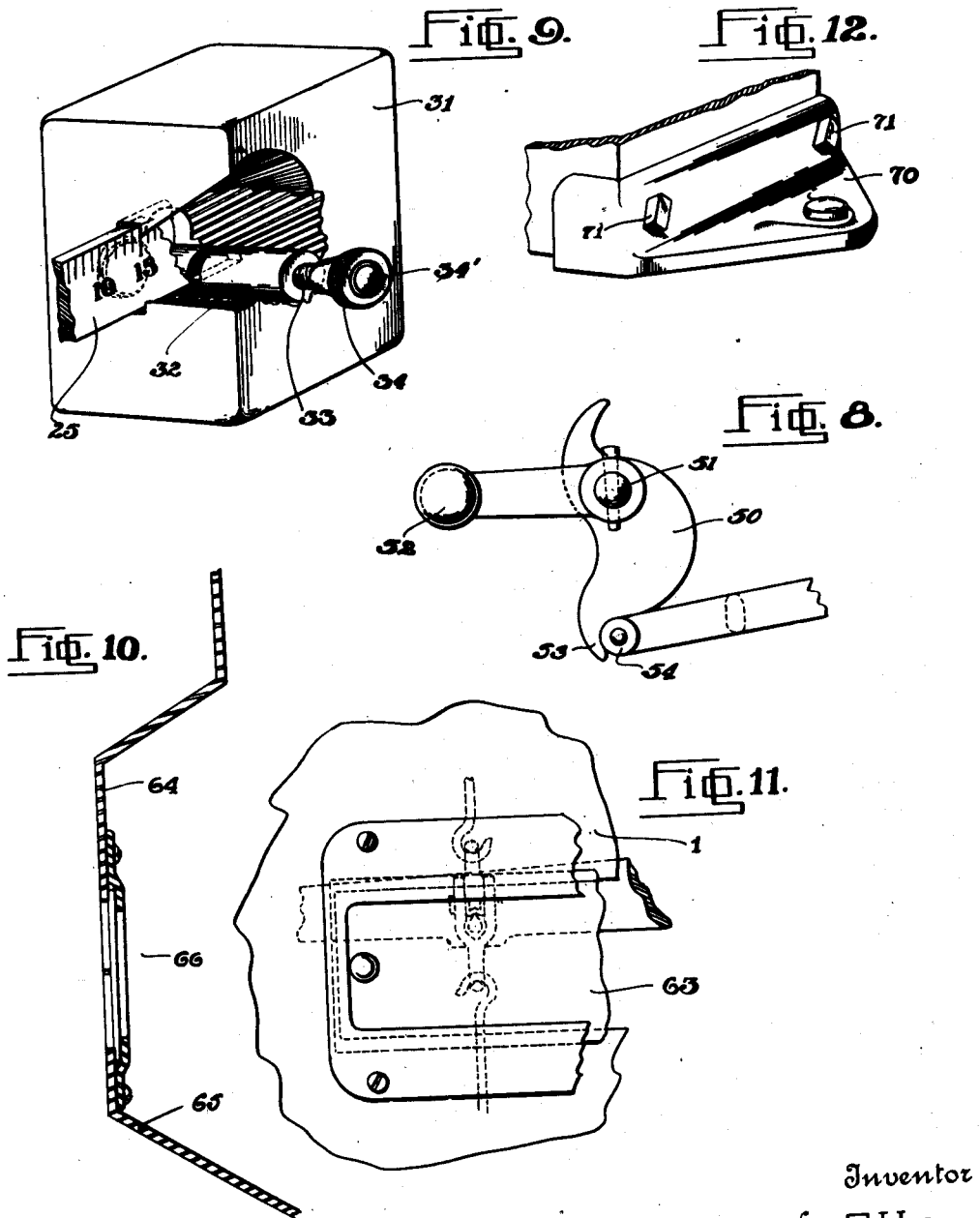

1,600,169

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 29, 1920. Serial No. 433,920.

This invention relates to weighing scales, and particularly to scales of the so-called dormant type such as are designed to be permanently located on factory and warehouse floors and shipping platforms. Certain features of the invention are, however, applicable to beam scales generally.

One of the principal objects of the invention is the provision of improved capacity-increasing means and improved means for manipulating the same.

Another object is the provision of improved mechanism for indicating whether or not the capacity-increasing means is in operation.

Another object is to arrange and support such capacity-increasing mechanism so that it may be employed with pendulum mechanism and self-contained platforms of known construction such as are ordinarily used without the capacity-increasing mechanism, whereby such platforms and pendulum mechanisms are rendered interchangeable.

Another important object is the provision of an improved sealing device for the beam mechanism of the scale.

Another object is the provision of improved poise-locking mechanism.

Another object is the provision of improved means for positioning a cabinet upon the platform deck.

Still another object is the provision of improved means for giving access to the beam weighing mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a part of a scale embodying my invention;

Figure 2 is an enlarged plan view, partly in section, of a sealing device employed in the scale;

Figure 3 is a front elevation thereof, parts being broken away;

Figure 4 is an end view showing in section the lever to which the device is attached;

Figure 5 is a still further enlarged fragmentary detail of the sealing device;

Figure 6 is a fragmentary front elevation showing the poise-manipulating mechanism employed;

Figure 7 is an end elevation thereof;

Figure 8 is a front elevation showing another detail of the poise-manipulating mechanism.

Figure 9 is a perspective view of a sliding poise, with parts broken away to show the means for locking it in position;

Figure 10 is a fragmentary sectional view showing the removable plate for making the beam mechanism of the scale accessible;

Figure 11 is a fragmentary front elevation showing an additional opening in the cabinet; and Figure 12 is a fragmentary perspective view showing the cabinet-positioning means.

Since my invention does not reside in the platform or platform mechanism per se, and since any preferred form of platform mechanism may be employed in the scale, I have considered it conducive to clearness to dispense with illustrations and description of any particular type of platform and platform lever mechanism.

The load-offsetting and indicating mechanism is supported by a cabinet 1 surmounted by a substantially watch-casing-shaped housing 2. Within the housing 2 is a frame 3 on which are supported oppositely-swinging pendulums 4 of substantially the type shown and described in my co-pending application Ser. No. 433,919, filed Dec. 29, 1920. The pendulums 4 are suitably connected by metallic ribbons 5 to a lever 6 fulcrumed within the housing 2 and to which is connected a tension rod 7 leading to the beam mechanism hereinafter described.

A hand 8 is pivoted to swing over a dial 9 suitably graduated so that weights within the capacity of the automatic mechanism may be indicated upon it.

The pendulum mechanism so far described may be interchangeable in respect of column dormant scales as well as the portable scale described in the aforesaid co-pending application. It is to be understood that other automatic mechanism may be substituted for that specifically described without departing from the invention in its broader aspect.

Fulcrumed within the cabinet 1 is a lever 10 to which the lower end of the tension rod 7 is connected and which is in turn connected by means of a link 11, shelf lever 12 and rod 13 to the platform lever mechanism (not shown) of the scale. It will be noted that the shelf lever 12 has a multiplication of 2:1. By omitting this lever and connecting the link 11 directly to the platform levers, the capacity of the scale mechanism may be reduced one half with no change in the pendulums and no further change in the lever mechanism. It will also be noted that since the rods 7 and 11 are connected to the lever 10 at the same distance from its fulcrum, the lever 10 does not form one of the multiplying levers between the platform and pendulums. It acts, however, as a beam and sealing lever. By means of a lock 14 it may be held against tilting so that when the scale is not in use for weighing purposes, shocks and strains cannot be transmitted from the platform to the automatic weighing mechanism. When the lever 10 is released it rocks, as movement is transmitted through it to the automatic weighing mechanism, and since it is a part having a comparatively great movement, it forms a convenient and sensitive carrier for a sealing device.

The sealing device forming a feature of my invention comprises a bracket 15 which is carried by the lever 10 and supports rotatable shafts 16 and 17, one of which (16) extends longitudinally of the lever, while the other (17) extends forwardly at right angles thereto, the longitudinally-extending shaft being threaded through a sealing weight 18 and the shafts being provided with meshing pinions 19 and 20, so that the shaft 16 is turned by turning the shaft 17. The sealing weight 18 is provided with a notch which receives the bracket 15 so that the weight is prevented from turning with the shaft 16, and as the shaft is turned, the weight is moved longitudinally.

In order to prevent any longitudinal play of the shaft 16 and weight 18, one end of the shaft 16 is bored out as at 21 (see Figure 5), a spring 22 is inserted in the recess so formed, and a threaded pin 23 having a reduced, unthreaded end is screwed through an arm 24 of the bracket, with its reduced end pressing against the spring within the recess 21. The shaft 16 is thus held against longitudinal play.

The lever 10 has forwardly-extending arms 24 at its ends which carry tare beams 25 located outside the cabinet. The sealing device is made operable from without the cabinet by extending the shaft 17 of the sealing device forwardly through one of the arms 24 and providing its forward end with a slot to be engaged by a screw driver. The means which I have provided for moving the center of mass of the lever 10 up and down to regulate the pendulum effect of the scale levers consists of a vertically-adjustable member 26 forming a part of the sealing weight 18. Cap screws 27 passing through vertical slots in the member 26 adjustably hold it in place. When the member is lowered, the pendulum effect of the lever system is increased, and when it is raised, the pendulum effect is decreased or eliminated.

When the poises 30 and 31 are at the extreme left position on the beam, the weight of any load within the capacity of the chart is automatically indicated upon the dial. The poises, when moved to the right, function like the sliding poises on an ordinary beam scale, and they may be used to offset tare, to increase the capacity of the scale, or for ordinary weighing.

In order to reliably hold the poises in adjusted position they are each provided with a lock which consists of a member 32 laterally movable in an opening in the poise and having a notch in its upper side to receive the lower side of the beam (see Fig. 9). A short shaft 33 fixed to the movable member projects through the forward side of the poise and is provided with a knurled nut 34 which may be turned to force the side of the notch against the beam so that the poise is locked against movement. When it is desired to move the poise, the knob 34 is turned slightly to loosen the member 32 so that it will slide along the beam without binding. A small knob 34' prevents the nut 34 from being turned entirely off the shaft 32.

Supported upon an adjustable pivot 35 on the lever 10 is a light frame consisting of a pair of plates 36 (see Fig. 6) held in upright position by a rod 37 which is attached to the lower ends of the plates and supports a loading box 38. Undue swinging of the rod 37 is prevented by a check link 39. A counterpoise-supporting bar 40 having a pair of wedge-shaped protuberances 41 is secured between the upper ends of the vertical plates 36 and is adapted to support a counterweight 42 of inverted U-shape which has depressions to receive the protuberances 41. Owing to the shape of the poise, its center of mass is below the supporting bar 40, and it is therefore, in effect, hung upon the bar and there is no liability of its being dislodged. The poise is provided with a pair of arms 43 having vertical slots 44 which receive lugs 45 projecting laterally from a lifting lever 46 which is fulcrumed in the upper end of the cabinet 1.

When the lifting lever is tilted to carry the lugs 45 upwardly, they engage the upper ends of the slots 44 and raise the poise off of the bar 40 a sufficient distance to avoid interfering with the beam lever 10. When the lifting lever is rocked to lower the lugs, the poise 42 is deposited upon the bar 40 and the lugs 45 then continue to move downwardly in the slots 44 until they are entirely out of contact with the arms during all the weighing movements.

The mechanism for rocking the lifting lever 46 consists of a cam 50 fixed to a shaft 51 which is journaled in the cabinet 1 and provided with a handle 52 located outside the cabinet 1. At the ends of the cam 50 are hooks 53 which alternatively engage a cross member 54 on the lifting lever and thus act as stops which serve to retain the lifting lever in adjusted position.

When it is desired to weigh a draft which is beyond the capacity of the dial 9, the handle 52 is turned 90° to the right, thereby depositing the poise 42 upon the beam lever 10. A flash indicator 55 is fixed to a pivoted arm 56 which is connected to the lifting lever 46 so that the flash indicator is moved into registration with a window 57 in the dial 9 when the poise 42 is deposited on the lever 10. The flash indicator is marked to indicate the weight counterbalanced by the poise 42 and the total weight of a load on the scale is found by adding the weight of the flash indication to the weight indicated by the hand 8. The poise 42 is preferably of the proper weight to counterbalance a load capable of turning the hand 8 to full capacity.

In case of an accident to the automatic mechanism, the loose poise 60 may be placed upon the poise pan 61 carried by the rod 37 and the automatic mechanism disconnected, the poise 60 being of the proper weight to exert a pull upon the lever mechanism equal to the pull exerted by the automatic mechanism at zero. With the automatic mechanism disconnected and the poise 60 in place on the pan 61, the scale may be operated as an ordinary beam scale.

When the loose poise 60 is not in use it is kept upon a shelf 62 conveniently located within the cabinet. The poise is accessible through an opening in the wall of the cabinet, the opening being sufficiently large to receive the arm of the operator when the poise 60 is to be placed upon or removed from the pan 61.

In order to make the beam lever readily accessible, the cabinet 1 is provided with an opening, which opening is covered by removable plates 64 and 65. The abutting edges of the plates 64 and 65 are stamped inwardly so as to form a depression 66 within which the beams 25 are carried. The abutting edges of the plates 64 and 65 are provided with notches 67 and 68 which, when the plates are in position, register to form vertical slots through which the beam supporting arms 24 extend. The plates 64 and 65 are secured in place by cap screws or other fastening devices and either or both of them may be removed without removing the beams 25.

When cabinet scales are shipped from the factory, the cabinets and platforms are, of course, separated, and it is sometimes difficult for the persons who install them to place the cabinets upon the platforms so that the connections are plumb. I have removed this difficulty by providing positioning flanges 70 attached to the ends of the cabinet 1. These flanges are attached to the cabinet before the scale leaves the factory. When the scale is assembled at the factory the cabinet is properly positioned and holes are bored in the deck in registration with holes in the flanges. When the scale is installed the cabinet is set with the holes in registration and locked in place with dowel pins.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:—

1. In a weighing scale, in combination, a housing having a dial in one side thereof, automatic weighing mechanism symmetrically mounted within said housing, a lever pivoted at one end within said housing, its other end lying substantially in vertical alignment with the center of said housing, said lever being connected to said housing and to said weighing mechanism, and a tension rod connected to said lever intermediate its ends and lying out of vertical alignment with the center of said housing.

2. In a weighing scale, in combination, a cabinet, a housing supported thereby, automatic load-offsetting mechanism within said housing, a multiplying lever within said housing having one end lying directly below the center of said housing and connected to said automatic mechanism, a beam lever within said cabinet, and connections equidistant from the fulcrum of said beam lever and lying out of vertical alignment with the center of said housing, one of said connections linking said beam lever to said automatic load-offsetting mechanism, and the other of said connections being adapted to link said beam lever to platform lever mechanism.

3. In a weighing scale, in combination, a cabinet, a housing supported thereby, automatic load-offsetting mechanism within said housing having one end lying directly below the center of said housing, and a multiplying lever within said housing connected to said automatic mechanism, a beam lever within said cabinet, a shelf lever within said cabinet, and connections equidistant from the fulcrum of said beam lever and lying out of vertical alignment with the center of said housing, said connections respectively linking said beam lever to said multiplying lever and said shelf lever.

4. In a weighing scale, in combination, weighing mechanism, and means for depositing a poise thereon, including a lifting cam having a stop at the end of its cam surface.

5. In a weighing scale, in combination, weighing mechanism, and means for depositing a poise thereon, including a rockable member and a cam fixed thereto, said cam having a stop at each end thereof.

6. In a weighing scale, in combination, a weighing lever, a poise adapted to be deposited thereon, a pivoted member adapted to lift said poise from said weighing lever, and a lifting cam for swinging said pivoted member, said cam having a stop thereon engageable with said lever.

7. In a scale poise, in combination, a poise body having an opening to receive a beam and a second opening intersecting the first said opening, a plug slidably mounted within said second opening and having a notch to receive the beam, and screw means for moving said plug to bring a side of said notch into clamping relation with said beam.

8. In a scale poise, in combination, a poise body having an opening to receive a beam and a second opening intersecting the first said opening, a plug slidably mounted within said second opening and having a notch to receive the beam, said plug having an integral shaft projecting from said poise body, and a nut on said shaft for moving said plug in said opening.

9. In a weighing scale, in combination, a lever having a forwardly-extending tare beam supporting arm, a movable poise carried by said lever, a rotatable shaft extending longitudinally of said lever and threaded through said poise, a spring for holding said shaft against longitudinal shifting, a shaft extending forwardly through said tare beam supporting arm, and meshing gears on said shafts.

10. In a sealing device, in combination, a lever, a poise carried thereby, means for moving said poise longitudinally of said lever, and a vertically-adjustable weight secured to said poise.

11. In a weighing scale, in combination, a lever having a forwardly-extending tare beam supporting arm, a movable poise carried by said lever, a vertically-adjustable weight secured to said poise, a rotatable shaft extending longitudinally of said lever and threaded through said poise, a shaft extending forwardly through said tare beam supporting arm, and meshing gears on said shafts.

HALVOR O. HEM.